(12) United States Patent
Bush

(10) Patent No.: US 10,749,935 B1
(45) Date of Patent: Aug. 18, 2020

(54) SYSTEMS AND METHODS FOR ELECTRONIC FILE TRANSFER

(71) Applicant: Eric Douglas Bush, Tampa, FL (US)

(72) Inventor: Eric Douglas Bush, Tampa, FL (US)

( * ) Notice: Subject to any disclaimer, the term of this patent is extended or adjusted under 35 U.S.C. 154(b) by 0 days.

(21) Appl. No.: 16/731,961

(22) Filed: Dec. 31, 2019

Related U.S. Application Data

(60) Provisional application No. 62/897,378, filed on Sep. 8, 2019.

(51) Int. Cl.
*H04L 29/08* (2006.01)
*H04W 12/00* (2009.01)
*H04W 4/80* (2018.01)
*H04W 12/06* (2009.01)

(52) U.S. Cl.
CPC ............ *H04L 67/06* (2013.01); *H04W 4/80* (2018.02); *H04W 12/003* (2019.01); *H04W 12/06* (2013.01)

(58) Field of Classification Search
CPC ...... H04L 67/06; H04W 12/003; H04W 4/80; H04W 12/06
USPC ................................................ 455/41.1, 41.2
See application file for complete search history.

(56) References Cited

U.S. PATENT DOCUMENTS

| | | | | |
|---|---|---|---|---|
| 8,467,770 B1 * | 6/2013 | Ben Ayed | ............. | H04L 63/107 455/411 |
| 2011/0293095 A1 * | 12/2011 | Ben Ayed | ........... | H04L 63/0492 380/270 |
| 2013/0109310 A1 * | 5/2013 | Mine | ................... | H04M 1/7253 455/41.1 |
| 2015/0381740 A1 * | 12/2015 | Gwin | .................... | H04L 67/142 709/228 |
| 2017/0091699 A1 * | 3/2017 | Mueller | ............... | G06Q 10/083 |
| 2018/0198789 A1 * | 7/2018 | Liu | ......................... | H04L 67/06 |

* cited by examiner

*Primary Examiner* — Ayodeji O Ayotunde
(74) *Attorney, Agent, or Firm* — Tiffany C. Miller; Inventions International Inc.

(57) ABSTRACT

A method for electronic file transfer having user coordinated electronic device recognition of at least two mobile devices in close proximity using a one touch simultaneous action on the software interface, contextual user preference, and secure real-time approvals by users for transfer or exchange of digital material between mobile devices using host server, database storage, and backups of transfer material.

4 Claims, 3 Drawing Sheets

SYSTEMS AND METHODS FOR ELECTRONIC FILE TRANSFER

CROSS REFERENCE TO RELATED APPLICATIONS

This application is an Original Non-Provisional Utility patent application entitled, "Systems and Methods for Electronic File Transfer", which claims priority to U.S. Provisional Patent Application No. 62/897,378, filed Sep. 8, 2019, entitled, "Mobile device recognition and validation management software system".

BACKGROUND OF THE INVENTION

1. Field of the Invention

This invention relates, generally, to electronic file transfer. More particularly, it relates to a method of mobile device recognition and validation management providing an action button on the interface of the mobile device software or application that when held simultaneously with another device in close proximity, the software host will recognize, identify, and send initial identifying information and request a connection.

2. Background Art

Currently, prior art such as U.S. Pat. No. 6,722,331 discloses the Bluetooth standard for communication between two selected electronic devices over a short-range wireless link. Further, U.S. Pat. No. 7,136,999 teaches electronic devices being authenticated with each other initially over a short-range wireless link. In particular, a pair of electronic devices undergo an initial Bluetooth link setup and authentication procedure including the input of a given numerical code or PIN into each device. When the devices are out-of-range of the wireless link, they may be authenticated to each other without subsequent user input when one of the devices invites the other to exchange authentication information over an alternative communications link. If the authentication is successful, the devices may then communicate over the alternative communications link as if they were within range of the original wireless link. It would be more desirable to eliminate the step of requiring each electronic device to be paired and authenticated by each user inputting an initial numerical code or PIN to establish the initial Bluetooth link setup procedure. Inputting a numerical code is time consuming and requires spelling accuracy. Due to human error, the inputted numerical code is subject to authentication failure which consumes even more time. Thus, it would serve as a substantial advantage to the mobile device users to save time connecting with at least one more mobile device in close proximity without the need for previous identifying information or the input of numerical codes.

Many methods of mobile device recognition and validation requires previous identifying information or include loudly exposing personal identifying information to the public. Some methods also include for example, a first individual handing over their electronic device to a second individual so that the second individual may input their contact information such as, their phone number, into the electronic device of the first individual. The problem with manually inputting data into another person's electronic device is spelling and input errors of contact information. For example, a person might have entered the incorrect mailing address into the electronic device by inadvertently adding an extra digit. In another problem with manually inputting data into another person's electronic device is the fact that handling of other people's personal property increases risk of potential damage to the electronic device and increases the risk of potential transfer of germs.

Apple's AirDrop feature is a file-transfer method configured for a user to share at least one electronic file such as a photo, a video, a website, a text file, contact information, or a document in a wireless manner utilizing Bluetooth, with other electronic devices having the AirDrop application enabled on their electronic device. For example, the sender of a data file is required to be located within a certain range such as approximately 30 feet from the receiving electronic device. In a first step, the sender enables the AirDrop application. Second, the sender selects a file such as a photo. In the fourth step of the AirDrop feature, the sender selects the desired receiver from the list of potential receivers. Fifth, the receiver receives the transfer request. Finally, the receiver may accept or deny the file transfer.

In the third step of the aforementioned AirDrop file-transfer method, the sender selects an action icon to open an action screen which lists all potential receivers by their first name and lists their AirDrop enabled electronic devices located within the 30 foot Bluetooth range of the sender. This step may be time consuming for a sender to locate their desired receiver if there are many potential receivers listed in the action screen. Further, if the sender does not know the name of the receiver, this step would be impossible to complete because the sender would not know which of the plurality of potential receivers their desired receiver is. Additionally, by voluntarily making potential receiver information such as, their first name and type of electronic device, readily available to anyone having the AirDrop application enabled on their electronic device, the list of potential receivers may be susceptible to theft. For example, a thief may look at the AirDrop action screen and see that Amy has an iPhone and is located within 30 feet. This makes users of the AirDrop application susceptible to becoming victims of theft or worse. Thus, there is a need for electronic file transfer without revealing the potential receiver or recipient information.

Further, these potential receivers or recipients of the electronic file transfer may become the target of hackers or other security threats, as a hacker could send out malicious files in the transfer requests to unknowing electronic devices appearing on the action screen list of the AirDrop application. Thus, there is a need for a more secure electronic file transfer without exposing unintended electronic devices or without creating an opportunity for receivers or recipients of the electronic file transfer to receive spam or malicious data transfer requests from nearby hackers.

However, in view of the prior art considered as a whole at the time the present invention was made, it was not obvious to those of ordinary skill in the pertinent art of electronic file transfer how the identified needs could be fulfilled.

SUMMARY OF THE INVENTION

The long-standing but heretofore unfulfilled need for a novel method for electronic file transfer having user coordinated electronic device recognition of at least two mobile devices in close proximity using a one touch simultaneous action on the software interface, contextual user preference, and secure real-time approvals by users for transfer or exchange of digital material between mobile devices using host server, central database storage, and backups of digital transfer and exchange material. This novel invention also includes improvements that overcome the limitations of prior art methods for electronic file transfer is now met by a new, useful, and non-obvious invention.

The novel method for electronic file sharing includes providing an electronic device including, but not limited to, a smart phone having a touch screen or a tablet having a touch screen. The method includes downloading the software application which is accessed by a user through a graphic user interface of the touch screen of the electronic device. This method includes the step of providing at least one profile of user selectable identifying information or links. This method includes the step of providing an action button in the graphic user interface of a pair of electronic devices. The action button is configured to initiate pairing of the two electronic devices when the action button of a first electronic device and the action button of a second electronic device both located within close proximity of each other are held simultaneously.

Additionally, a one touch simultaneous action on the interface of the mobile software or application establishes the pairing of a first electronic device with a second electronic device. For example, a first user of a first electronic device presses an action icon on the touch screen of the first electronic device. The icon can include an action including, but not limited to, "exchange" data, "send" data, or "receive" data. If the first user wants to "send" a file from the first user's first electronic device to a second user's second electronic device, than the first user selects the file they intend to send including, but not limited to, a phone number, an invoice, an email address, a name, a social media account, a website, or a photo and presses and holds the "send" icon for a predetermined time frame.

Further, as the first user is pressing and holding the "send" icon of the touch screen of the first electronic device during the predetermined time frame, the second electronic device of the second user or receiver or recipient of the electronic file is required to be within a close proximity of the first electronic device. The second user if the second electronic device is also required to open the novel software application through the graphic user interface of the touch screen of the second electronic device and then select an action including, but not limited to, "exchange" data, "send" data, or "receive" data. For example, if the second user wants to "receive" a file on a second user's second electronic device from the first user's first electronic device, than the second user selects and presses the "receive" icon for a predetermined time frame. The "send" icon of a first electronic and the "receive" icon of a second electronic device must be within a close proximity of each other and must be pressed simultaneously for a predetermined time period for successful electronic wireless pairing to occur.

It is within the scope of this current invention for one touch simultaneous action to include, but not be limited to, a first user of a first electronic device having a touch screen and a second user of a second electronic device having a touch screen both pressing an icon on a graphic user interface at the same time or at least an overlapping time frame. It is within the scope of this invention for a predetermined time frame to be any time frame sufficient enough to establish a wireless connection or pairing between at least a first electronic device and a second electronic device. For example, the first user of a first electronic device presses and holds the "send" icon for three seconds at the same time the second user of a second electronic device pressed and holds the "receive" icon for three seconds. The mobile software or application identifies appropriate devices using the simultaneous action on the interface and proximity between mobile devices.

After the device pairing, the software or application then generates a request with initial identifying information. For example, a first user of a first electronic holds the "send" icon simultaneously with a second user holding the "receive" icon of a second electronic device to initiate the electronic transfer of an invoice from the first user of a first electronic device to a second user of a second device. The receiver or second user of a second device will receive an instant notification requiring a response to either "accept" or "deny" the incoming electronic file. If the second user of the second electronic selects to accept the incoming electronic file, the incoming electronic file will download. If the second user of the second electronic selects to deny the incoming electronic file, the incoming electronic file will not be sent. Once all users have approved the request, the software or application will facilitate the connection, transfer, and/or exchange of information or material of an electronic file.

The software or applications host server will recognize, identify, and send initial identifying information. A request to connect to complete the transfer of secondary information or transfer material to respective mobile devices will be generated. It is within the scope of this current invention for identifying information to include but not be limited to, and desired information that a first user wants to send to a second user. Upon approval by all devices, the software or application will facilitate the connection and electronic file transfer from the original mobile device to at least one recipient mobile device using the host server. The central database then stores transfer information, exchange information, and backups the digital transfer and exchange material.

In a preferred embodiment, the method of electronic file transfer includes providing an electronic device including, but not limited to, any mobile device, a smart phone having a touch screen, or a tablet. A first electronic device is configured to pair with a second electronic device in close proximity without the need for prior identifying information. It is within the scope of this invention for at least two electronic devices in close proximity to be paired or connected. It is envisioned that the pairing or connection of the pair of electronic devices be done with Bluetooth or any wireless or wired communications system. It is within the scope of this invention for close proximity to include, but not be limited to approximately 30 feet. It is within the scope of this invention for prior identifying information to include, but not be limited to, a recipient's name, a sender's name, a phone number, an email address, a social media account, an account, or an authentication code or PIN generated to establish an initial Bluetooth link.

In a preferred embodiment, the method of electronic file transfer may be implemented into the interface of an existing mobile software or application. It is also envisioned that the novel method of electronic file transfer includes step of identifying a plurality of mobile devices wanting to connect based on contextual user preference, simultaneous coordinated action on the graphic user interface of a plurality of electronic devices, and close proximity between the plurality of electronic devices. It is within the scope of this invention for contextual user preference to include, but not be limited to, at least one interactive user profile with a plurality of inter selectable identifying information and links such as options to send, receive, or exchange information through the graphic user interface of the mobile software or application. A user can catalog all approved requests under a group name. In another embodiment, this novel method of electronic file transfer includes receiving multiple or group requests for mobile devices individually, wherein all can be approved individually or as a group.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
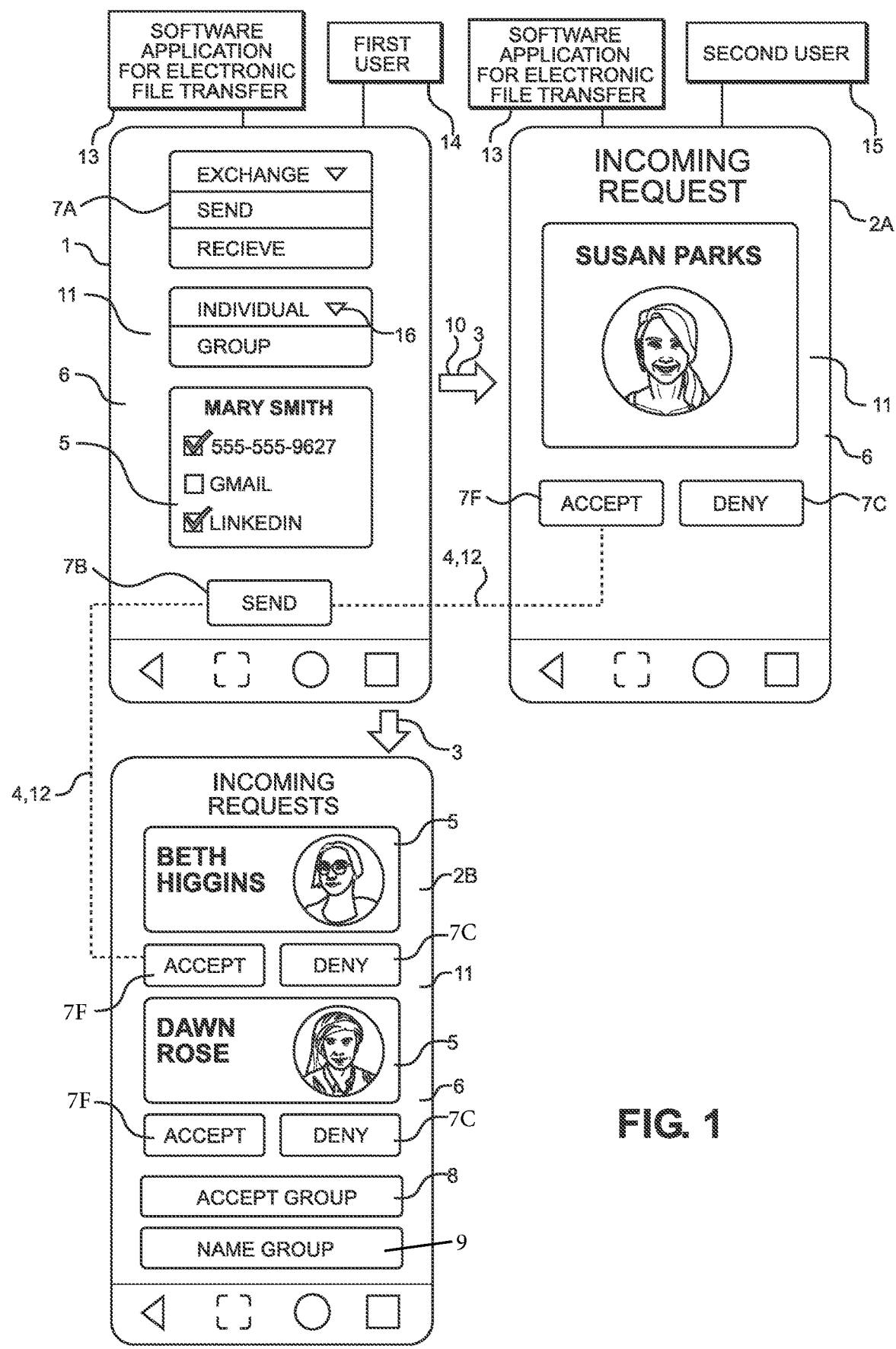
FIG. 1 is a diagram of the pairing, authenticating, and transferring of electronic data between the first electronic device and the second electronic device of the novel method of electronic file transfer.

It will now be seen, referring to FIG. 1, the novel method of authenticating a pair of first electronic device 1 and second electronic device 2 each having an associated software application 13 enabled for electronic file transfer. First electronic device 1 and second electronic device 2 have touch screen 11 with graphic user interface 6 and software application 13 configured for electronic file transfer. Electronic device 2A of FIG. 1 illustrates electronic device 2A receiving an incoming request from an individual. Electronic device 2B of FIG. 1 illustrates electronic device 2A receiving an incoming request from a group. Provided is first electronic device 1 having touch screen 11. First electronic device 1 has software application 13. Provided is second electronic device 2 having touch screen 11. Second electronic device 2 has software application 13.

This method illustrated in FIG. 1 includes the step of establishing a short-range wireless link 3, whereby, first electronic device 1 and second electronic device 2 are wirelessly in communication with each other when they are both located within a close proximity to each other. In the next step, executing an authentication protocol 4 between first electronic device 1 and second electronic device 2 is performed, whereby, authentication protocol initiates a pairing request over short-range wireless link 3 between first electronic device 1 and second electronic device 2 when a first user 14 of first electronic device 1 selects at least one electronic file to transfer. At least one electronic file 5 is identifying information 5 such as a name, phone number, email address, or social media. Action icon list 7A lists different actions such as exchange, send, or receive, that first user 14 may select to have performed on electronic file 5.

FIG. 1 further illustrates first user 14 of first electronic device 1 selects at least one or a plurality of electronic files 5 through graphic user interface 6 of first electronic device 1. First user 14 presses and holds at least one button 7B of action icon list 7A for a predetermined length of time simultaneously 12 with second user 15 of second electronic device 2 pressing and holding at least one button of the action icon being accept button 7F or deny button 7C for a predetermined length of time. The pairing request would be completed if second user 15 of second electronic device 2 pressed and held simultaneously the accept 7F icon when first user 14 pressed and held down send 7B icon. Authentication protocol 4 sends a transfer request to second user 15 of second electronic device 2, whereby, second user 15 is required to select an accept 7F to receive or deny 7C icon to avoid an incoming file transfer. The pairing request 10 over short range wireless link 3 initiates authentication protocol 4 in that the accept 7F icon and deny 7C icon only appear to second electronic device 2 of second user 15 when first electronic device 1 and second electronic device 2 are within close proximity to each other. As shown in FIG. 1, second electronic device 2B may accept 7F or deny 7C a plurality of authentication requests by selecting "accepting group" icon 8, which may be named 9 as well.

As shown in FIG. 1, the method for authenticating first electronic device 1 and second electronic device 2 for electronic file 5 transfer includes the step of short range wireless link 3 to be activated in a close proximity being a range of approximately 30 feet between first electronic device 1 and second electronic device 2. Only when the first electronic device 1 and second electronic device 2 are within a close proximity, the authentication protocol 4 will activate by implementing the selected action icon 7 selected by the first user 14 upon the desired electronic data 5. For example, first user 14 wants to send 7B an individual 16 second user 15 their name and social media information 5 when first user's 14 first electronic device 1 is located within 30 feet of second user's 15 second electronic device 2. If both users have the software application 13 installed on their respective devices 1 and 2, then first user 14 and second user 15 simultaneously 12 press and hold desired action icons 7. In this instance for example, first user 14 presses "send" 7B and second user 15 presses "accept" 7F simultaneously for a predetermined length of time such as three seconds, to authenticate the data 5 transfer from first electronic device 1 to second electronic device 2. At least one button of action icon list 7A is a send button 7B. At least one button of action icon list 7A is a receive button 7D, accept button 7F, deny button 7C, or pay button 7E.

Figure 2:
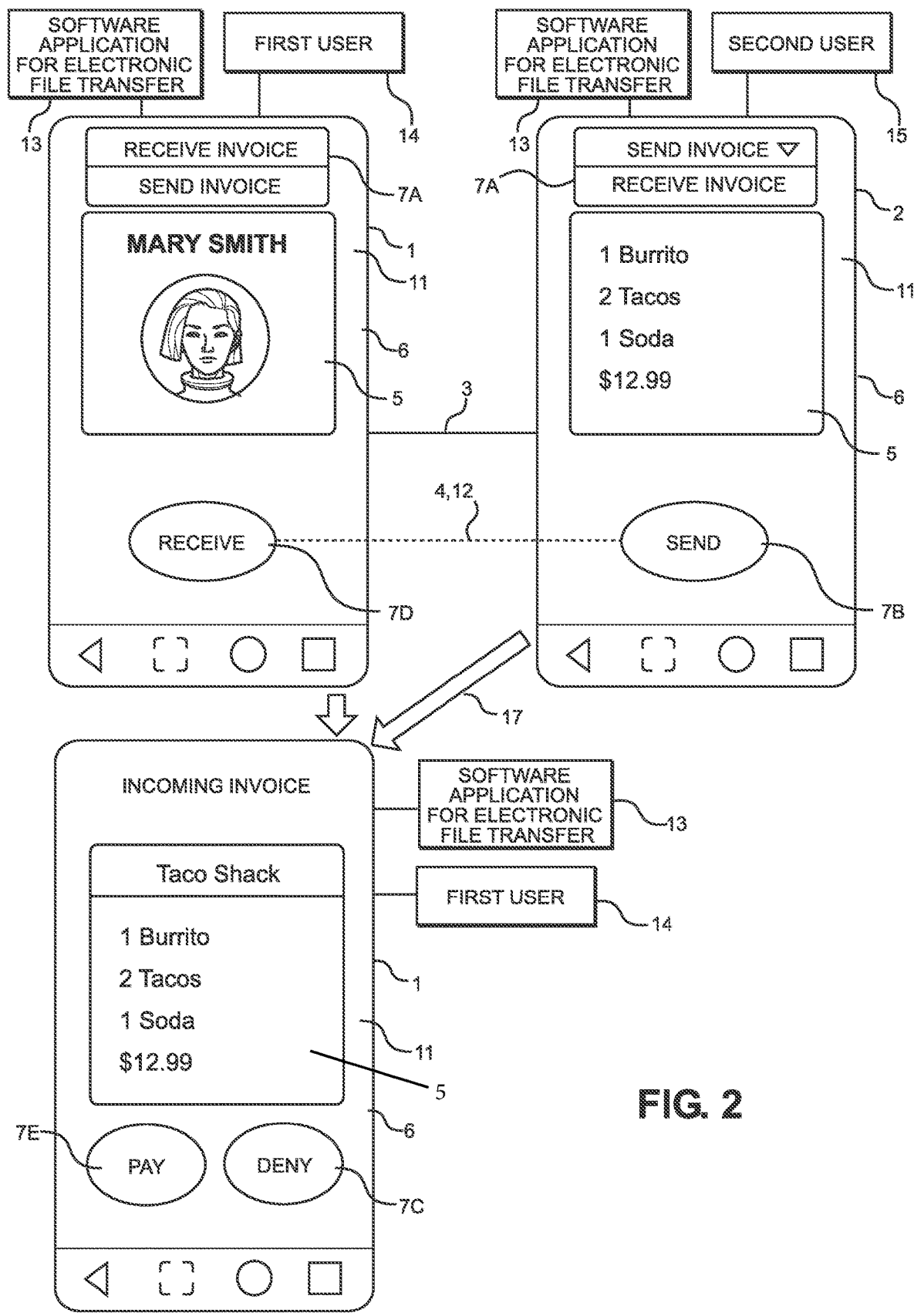
FIG. 2 is a diagram of the pairing, authenticating, and transferring of electronic data between the first electronic device and the second electronic device of the novel method of electronic file transfer.

FIG. 2 illustrates an example of second user 15 sending informational data 5 being an invoice 5 to first user 14 utilizing the simultaneous 12 action being within close proximity and utilizing a short range wireless link 3. Second user 15 has second electronic device 2 having software application 13 for electronic file transfer. Second electronic device 2 has touch screen 11 and graphic user interface 6. Action icon 7A lists actions to send invoice or receive invoice. In this example, second user 15 desires to send invoice to first electronic device 1 of first user 14. First electronic device 1 has software application 13 for electronic file transfer, touch screen 11, and graphic user interface 6. First electronic device 1 displays identifying information 5 being Mary Smith when the first electronic device 1 and second electronic device 2 are within a close proximity, the authentication protocol 4 will activate. If first user 14 wished to proceed with receiving an invoice from Mary Smith, first user 14 must simultaneously 12 press receive icon 7D while second user 15 is pressing send icon 7B. Once the predetermined time frame for each of the first user 14 holding receive icon 7D and second user 15 simultaneously 12 holding down send icon 7B of action icons 7A, such as for 10 seconds has been met, the invoice 5 will be transferred 17 from second user 15 to first user 14. When first user 14 receives invoice 5 from second user 15, first user 14 may select to pay 7E or deny 7C.

Figure 3:
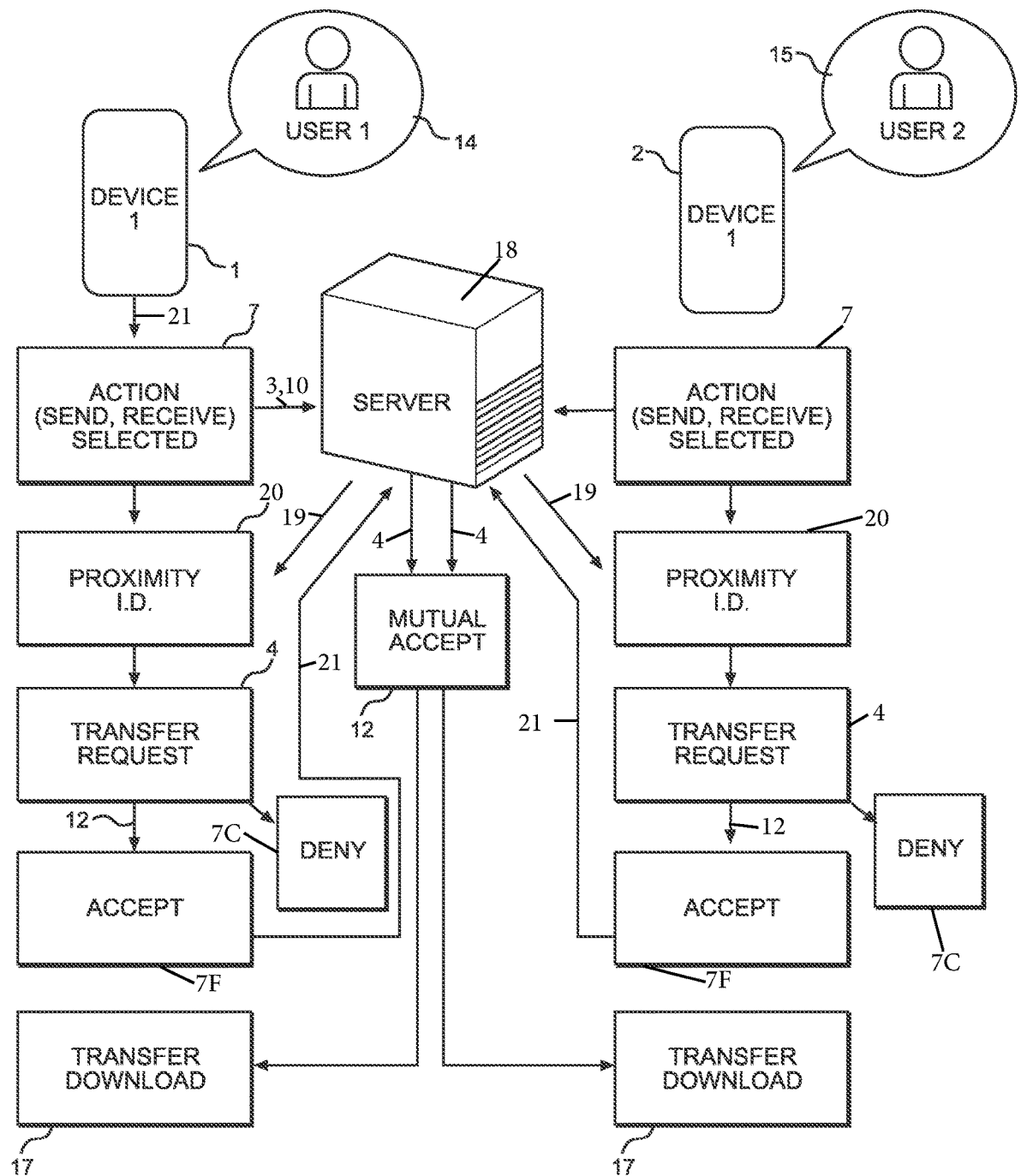
FIG. 3 is a diagram of the pairing, authenticating, and transferring of electronic data between the first electronic device and the second electronic device of the novel method of electronic file transfer.

FIG. 3 illustrates first user 14 having first electronic device 1 and second user 15 having second electronic device 2. Action icon list 7 displays 21 icons to a user such as, to send or to receive data. Pairing request 10 is communicated to server 18 through short range wireless link 3. If first electronic device 1 and second electronic device 2 are within a predetermined distance range 20 such as between 0-30 feet, the server will proceed 19 with transfer request 4 of authentication protocol. Simultaneous 12 action such as both first user 14 and second user 15 simultaneously 12 holding accept icon 7F will be required during the authentication protocol and will be communicated to server 18. If indeed both users mutually press and hold, for a predetermined time, to accept 7F, than the transfer 17 of electronic data will be completed. Action 7 is selected, then predetermined range is 20 of proximity is identified, then transfer request 4 is initiated for authentication protocol, then simultaneous action 12 is required to complete transfer download 17.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now the invention has been described.

The invention claimed is:

1. A method of authenticating a pair of first and second electronic devices each having an associated software application enabled for electronic file transfer, comprising the steps of:

providing a software application configured for electronic file transfer; providing a first electronic device having a touch screen, said first electronic device having said software application;

providing a second electronic device having a touch screen, said second electronic device having said software application;

establishing a short-range wireless link, whereby, said first electronic device and said second electronic device are wirelessly in communication with each other when they are both located within a close proximity to each other;

executing an authentication protocol between said first electronic device and said second electronic device, whereby, said authentication protocol initiates a pairing request over said short-range wireless link between said first electronic device and said second electronic device when a first user of said first electronic device selects at least one electronic file to transfer, said at least one electronic file is identifying information;

said first user selects said at least one electronic file through said graphic user interface of said first electronic device and said first user presses and holds at least one button of the action icon for a predetermined length of time simultaneously with a second user of a second electronic device pressing and holding at least one button of the action icon for a predetermined length of time, thereby, completing said pairing request;

said authentication protocol sends a transfer request to said second user of said second electronic device, whereby, said second user is required to select an accept or deny icon to receive or avoid an incoming file transfer.

2. The method for authenticating a pair of first and second electronic devices for electronic file transfer of claim 1, further comprising the steps of: said close proximity is a range of approximately 30 feet between said first electronic device and said second electronic device.

3. The method for authenticating a pair of first and second electronic devices for electronic file transfer of claim 1, further comprising the steps of: said at least one button of said action icon is a send button.

4. The method for authenticating a pair of first and second electronic devices for electronic file transfer of claim 1, further comprising the steps of: said at least one button of said action icon is a receive button.

* * * * *